United States Patent
Harper

(10) Patent No.: US 6,823,381 B1
(45) Date of Patent: Nov. 23, 2004

(54) METHODS, SYSTEMS AND COMPUTER PROGRAM PRODUCTS FOR DETERMINING A POINT OF LOSS OF DATA ON A COMMUNICATION NETWORK

(75) Inventor: Kenneth Lee Harper, Coral Springs, FL (US)

(73) Assignee: Trendium, Inc., Fort Lauderdale, FL (US)

(*) Notice: Subject to any disclaimer, the term of this patent is extended or adjusted under 35 U.S.C. 154(b) by 557 days.

(21) Appl. No.: 09/641,045

(22) Filed: Aug. 17, 2000

(51) Int. Cl.[7] .............................. G06F 15/173
(52) U.S. Cl. .................. 709/224; 709/223; 709/235; 709/238; 709/239; 370/245; 370/254
(58) Field of Search ................. 709/224, 223, 709/235, 238, 239; 714/25, 43, 56; 370/242, 245, 254

(56) References Cited

U.S. PATENT DOCUMENTS

| | | | |
|---|---|---|---|
| 5,390,188 A | * | 2/1995 | Dawson ....................... 714/717 |
| 5,926,463 A | | 7/1999 | Ahearn et al. ............... 370/254 |
| 6,006,016 A | * | 12/1999 | Faigon et al. ................. 714/48 |
| 6,363,056 B1 | * | 3/2002 | Beigi et al. .................. 370/252 |
| 6,515,967 B1 | * | 2/2003 | Wei et al. .................... 370/244 |

FOREIGN PATENT DOCUMENTS

| | | |
|---|---|---|
| EP | 0 948 165 | 10/1999 |
| GB | 2 337 903 | 12/1999 |
| WO | 00/51292 | 8/2000 |

* cited by examiner

*Primary Examiner*—Glenton B. Burgess
*Assistant Examiner*—Kevin Parton
(74) *Attorney, Agent, or Firm*—Myers Bigel Sibley & Sajovec

(57) ABSTRACT

Methods, systems and computer program products are provided which may provide for determining a point of loss for data records to be communicated between a source and a destination on a communication network. A topology of the communication network between the source and the destination is determined which includes a plurality of connecting nodes. A number of data records from the source directed to the destination passing between ones of the connecting nodes during a determined period of time is monitored. At least one of the connecting nodes is identified as the point of loss based on the monitored number of data records and the determined topology.

39 Claims, 7 Drawing Sheets

METHODS, SYSTEMS AND COMPUTER PROGRAM PRODUCTS FOR DETERMINING A POINT OF LOSS OF DATA ON A COMMUNICATION NETWORK

FIELD OF THE INVENTION

The present invention relates to network communications and, more particularly, to analysis of network communication paths.

BACKGROUND OF THE INVENTION

Computer networks have grown increasingly complex with the use of distributed client/server applications, mixed platforms and multiple protocols all in a single physical backbone. The control of traffic on networks is likewise moving from centralized information systems departments to distributed work groups. The growing utilization of computer networks is not only causing a move to new, high speed technologies, but is at the same time making the operation of computer networks more critical to day to day business operations. The use of quality of service (QoS) criteria for managing and/or contracting communication service level agreements (SLAs) is becoming increasingly common in networks, such as networks supporting Internet protocol (IP) communications.

Deregulation of telecommunications providers, new communications technologies, and the Internet have often been cited as important factors in bringing about increased competition in the delivery of telecommunications services. As a result of this increased competition, telecommunications providers have generally been under pressure to improve efficiency and cut costs and yet still maintain a high quality level of service for their customers. In this competitive environment, one area in which telecommunications providers may be able to gain a competitive edge is in the support systems that are used to operate, manage, and maintain the telecommunications networks. These support systems may be called operational support systems (OSS).

Broadly stated, an OSS for a telecommunications network may include software services that are used to support the operations of a telecommunications network. Three support areas that may be addressed by a telecommunications OSS are 1) provisioning and order management, 2) billing and customer support, and 3) network management. Provisioning and order management may include such functions as service activation, service order processing, and service provisioning. Billing and customer support may include such functions as data collection, retail and wholesale billing, bill compilation, and customer care. Finally, network management and/or network service quality management may include such functions as fault management, performance monitoring, error analysis, and security.

One problem related to network management which may be encountered is a loss of data records during transmission from a source device to a destination device over a communication network. It is desirable, under such circumstances, to be able to identify the root cause device for such lost data records, so as, for example, to facilitate prompt initiation of corrective actions. However, the increasingly complex structure of such communications networks, such as the Internet, complicates the identification of the root cause for such losses given the numerous routing devices which may define the network between the source and destination device and further given the nature of the structure of the Internet in which it is common to have a variety of different paths which may be utilized for transmission of data records between a given source and destination device. It is known with various commercially available network management system packages to utilize commands such as segment path identification commands and "ping" features in combination with direct queries to the routing devices defining the topology of a network to obtain status and performance information. This approach generally relies on overall performance information from the various routing devices defining the communications network based on either passive or active generated data transmissions to characterize the status of communications network components rather than evaluating the specific data flow which encountered the lost data records and directly identifying a point of loss.

SUMMARY OF THE INVENTION

Embodiments of the present invention include methods, systems and computer program products for determining a point of loss for data records to be communicated between a source and a destination on a communication network. A topology of the communication network between the source and the destination is determined which includes a plurality of connecting nodes. A number of data records from the source directed to the destination passing between ones of the connecting nodes during a determined period of time is monitored. At least one of the connecting nodes is identified as the point of loss based on the monitored number of data records and the determined topology.

In further embodiments of the present invention, a plurality of network appliances configured to obtain a number of data records passing between a pair of connecting nodes during a time period are positioned between respective ones of the connecting nodes. Monitoring operations utilize the network appliances by identifying at least one of the network appliances on the topology and obtaining the number of data records from the source directed to the destination obtained by the identified at least one network appliance during the determined period of time.

Operations in accordance with embodiments of the present invention may include identifying at least one first hop one of the network appliances which is coupled to the source over the communication network. In addition, at least one next hop one of the network appliances is identified which is coupled between the at least one first hop one of the network appliances and the destination. A number of data records from the source directed to the destination obtained by the at least one first hop one of the network appliances and the at least one next hop one of the network appliances during the determined time period is obtained. The number of data records from the source directed to the destination obtained by one of the at least one first hop one of the network appliances is compared with the number of data records from the source directed to the destination obtained by ones of the at least one next hop one of the network appliances coupled between the one of the at least one first hop one of the network appliances and the destination A connecting node positioned between the at least one first hop one of the network appliances and the ones of the at least one next hop one of the network appliances is identified as the point of loss for data records if the number of data records from the source directed to the destination obtained by one of the at least one first hop one of the network appliances differs by a threshold amount from the number of data records from the source directed to the destination obtained by ones of the at least one next hop one of the network appliances coupled between the one of the at least one first hop one of the network appliances and the destination. The first hop network appliance may be coupled to the source without intervening ones of the network appliances. The next hop network appliance(s) may be coupled between the first hop network appliance and the destination without intervening ones of the network appliances.

In yet other embodiments of the present invention, a number of data records from the source directed to the destination obtained by an upstream one of the network appliances is compared with a number of data records from the source directed to the destination obtained by at least one downstream one of the network appliances coupled between the upstream one of the network appliances and the destination at an adjacent downstream position. Comparisons are performed for successive ones of the network appliances until either the destination is reached or at least one of the connecting nodes is identified as the point of loss for data. A connecting node positioned between the upstream one of the network appliances and corresponding downstream ones of the network appliances is identified as the point of loss for data records if the number of data records from the source directed to the destination obtained by the upstream one of the network appliances differs by a threshold amount from the number of data records from the source directed to the destination obtained by the corresponding downstream ones of the network appliances. Comparison operations may further be repeated for successive ones of the network appliances on the topology until the destination is reached even after a point of loss is identified and all connecting nodes positioned between upstream ones of the network appliances and corresponding downstream ones of the network appliances may be identified as points of loss for data records if the number of data records from the source directed to the destination obtained by respective upstream ones of the network appliances differs by a threshold amount from the number of data records from the source directed to the destination obtained by corresponding downstream ones of the network appliances.

In further embodiments of the present invention, the obtained numbers of data records from the source directed to the destination are adjusted to compensate for in transit introduced changes to data records before comparing the number of data records from the source directed to the destination obtained by one of the at least one first hop one of the network appliances with the number of data records from the source directed to the destination obtained by ones of the at least one next hop one of the network appliances coupled between the one of the at least one first hop one of the network appliances and the destination. The obtained numbers of data records from the source directed to the destination may be adjusted to compensate for encryption related changes in data records introduced by a connecting node coupled between the a first hop one and at least one next hop one of the network appliances.

In other embodiments of the present invention, the determined period of time is defined for the at least one first hop one of the network appliances and the at least next hop one of the network appliances based on a delay between the at least one first hop one of the network appliances and the at least next hop one of the network appliances. The determined time period may be defined for the at least one first hop one of the network appliances and the at least next hop one of the network appliances based on an average delay between the at least one first hop one of the network appliances and the at least next hop one of the network appliances determined over an averaging window.

In further embodiments of the present invention, the threshold amount is defined based on an expected timing related variability between numbers of data records obtained by ones of the network appliances. The threshold amount may be defined based on a percentage of data record throughput for respective ones of the network appliances.

In yet other embodiments of the present invention, the connecting nodes are routing devices selected from the group consisting of routers, bridges and switches. A network appliance may be positioned between each defined connecting node in the topology and all other adjacent defined connecting nodes in the topology. One or more of the defined connecting nodes may include a plurality of routing devices.

In further embodiments of the present invention, systems are provided for determining a point of loss for data records to be communicated between a source and a destination on a communication network. The system includes a memory including a topology of the communication network between the source and the destination, the topology including a plurality of connecting nodes. A receiver receives from a plurality of network appliances at determined locations on the communication network a number of data records from the source directed to the destination passing between ones of the connecting nodes during a determined period of time. A comparison circuit identifies at least one of the connecting nodes as the point of loss based on the received number of data records, the locations of the network appliances and the topology.

The systems in further embodiments include the plurality of network appliances. Pairs of the connecting nodes define segments of the topology between the source and the destination. At least one of the network appliances is coupled between each of the pairs of the connecting nodes. The network appliances in further embodiments include a timer. A filter identifies ones of a plurality of data records detected by the at least one of the network appliances that are being transmitted from the source to the destination on the communications network. A counter counts filtered ones of the plurality of data records, the counter being configured to be reset responsive to the timer. A transmitter transmits counts from the counter to the receiver. The filter may be configured to identify ones of the plurality of data records based on the source Internet Protocol (IP) address and destination IP address of a data packet containing data records detected by the at least one of the network appliances.

While the invention has been described above primarily with respect to method aspects of the invention, both systems and/or computer program products are also provided.

DETAILED DESCRIPTION OF PREFERRED EMBODIMENTS

Figure 1:
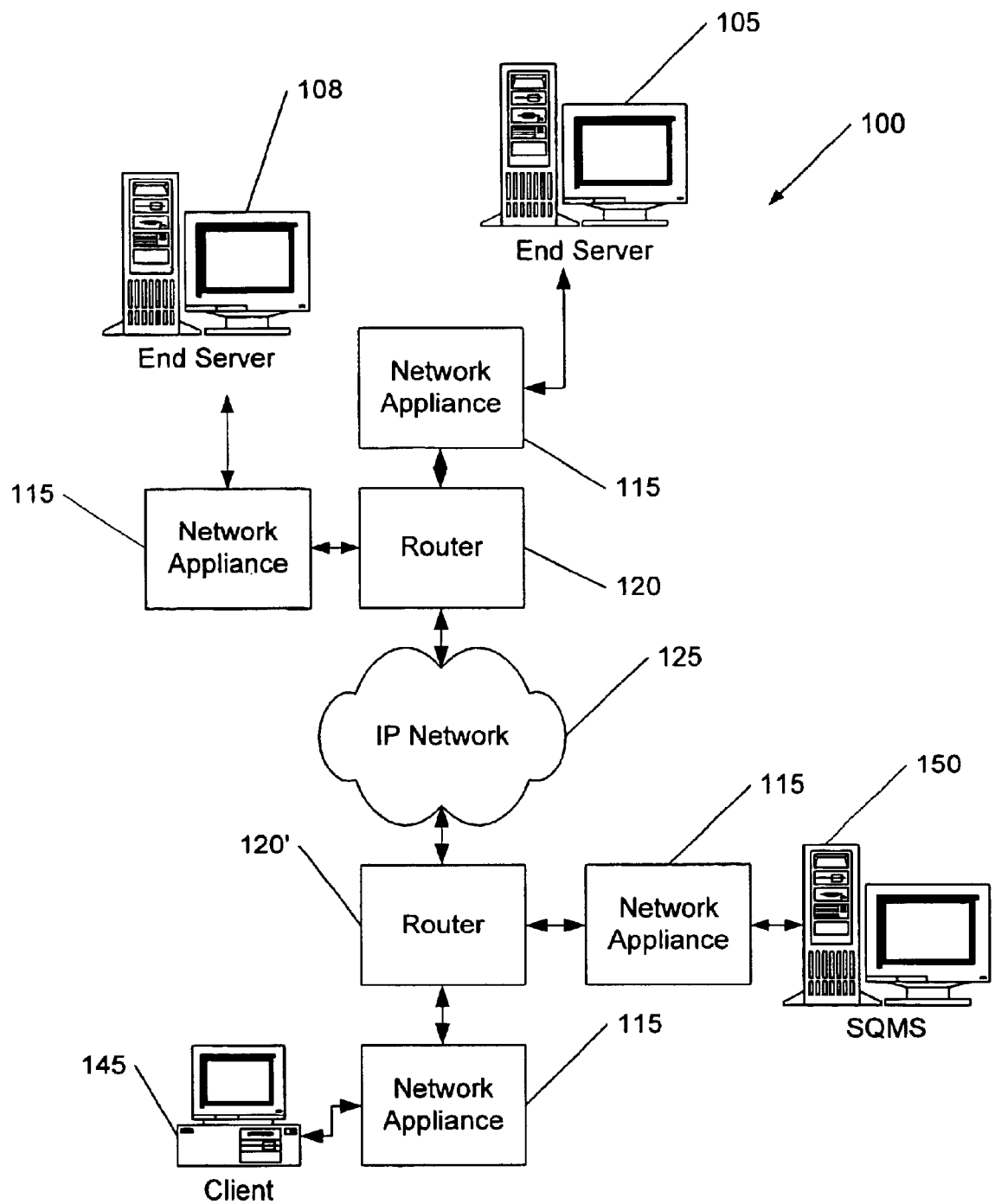
FIG. 1 is a block diagram of a network of data processing systems connected over a communications network and including a service quality management station (SQMS) and network appliances according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as Java@, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

Various embodiments of the present invention will now be described with reference to FIGS. 1 through 7. FIG. 1 is a block diagram of a computer network including a service quality management station (SQMS) 150 supporting evaluation of loss of data records between a source one and a destination one of the servers 105, 108 and the client 145. As illustrated in FIG. 1, the communication network 100 includes a plurality of connecting nodes and endpoint nodes. The server 105 and the server 108 as well as the SQMS 150 and the client 145 are shown as endpoint nodes in FIG. 1. However, it is to be understood that each of these devices may also operate as a connecting node to other devices on the communication network 100.

Both the server 105 and the server 108 connect through a network appliance 115 to a routing device 120. The routing device 120 may be a router, a bridge, a switch, etc. As used herein, the terms bridge and switch will be used interchangeably and may be referred to as "bridge/switch" as such devices will be understood by those of skill in the art to be essentially interchangeable for purposes of the present invention. A bridge/switch as used herein may best be understood by contrast to a router. In particular, a bridge/switch, as contrasted with a router, does not use layer three protocol information, for example, Internet Protocol (IP) information, to process communications from devices passing through the bridge/switch. They are otherwise interchangeable with routers for purposes of the present invention and bridge/switches and routers all generally be referred to as routing devices. An example of a network appliance suitable for use with the present invention in that it may provide information related to data counts passing between nodes for particular source and destination devices is the QoSWorks™ product available from Sitara Networks of Waltham, Mass.

The routing device 120 illustrated in FIG. 1 connects to the IP network 125. The IP network 125 is further connected to the router 120'. The IP network 125 is illustrated schematically as a cloud and may include one or more additional routing devices and/or network appliances along the network's path between the router 120 and the router 120'.

Operations of the SQMS 150 and the network appliances 115 will be further described herein with reference to the flowchart illustrations and block diagrams. It is to be understood, however, that the communication network 100 may be provided by wired or wireless links using a variety of physical layer media and still stay within the teachings and scope of the present invention. Furthermore, while the network appliances 115 are illustrated as separate from the routing devices 120, 120' in FIG. 1 (see also, FIG. 5), they may be implemented as operative aspects of the routing devices 120, 120' while still falling within the scope of the present invention. Also, while the communication network 100 is illustrated as a computer network, it may be a variety of types of communication network such as voice, video and/or data including a variety of source/destination node devices defining the communication network.

Figure 2:
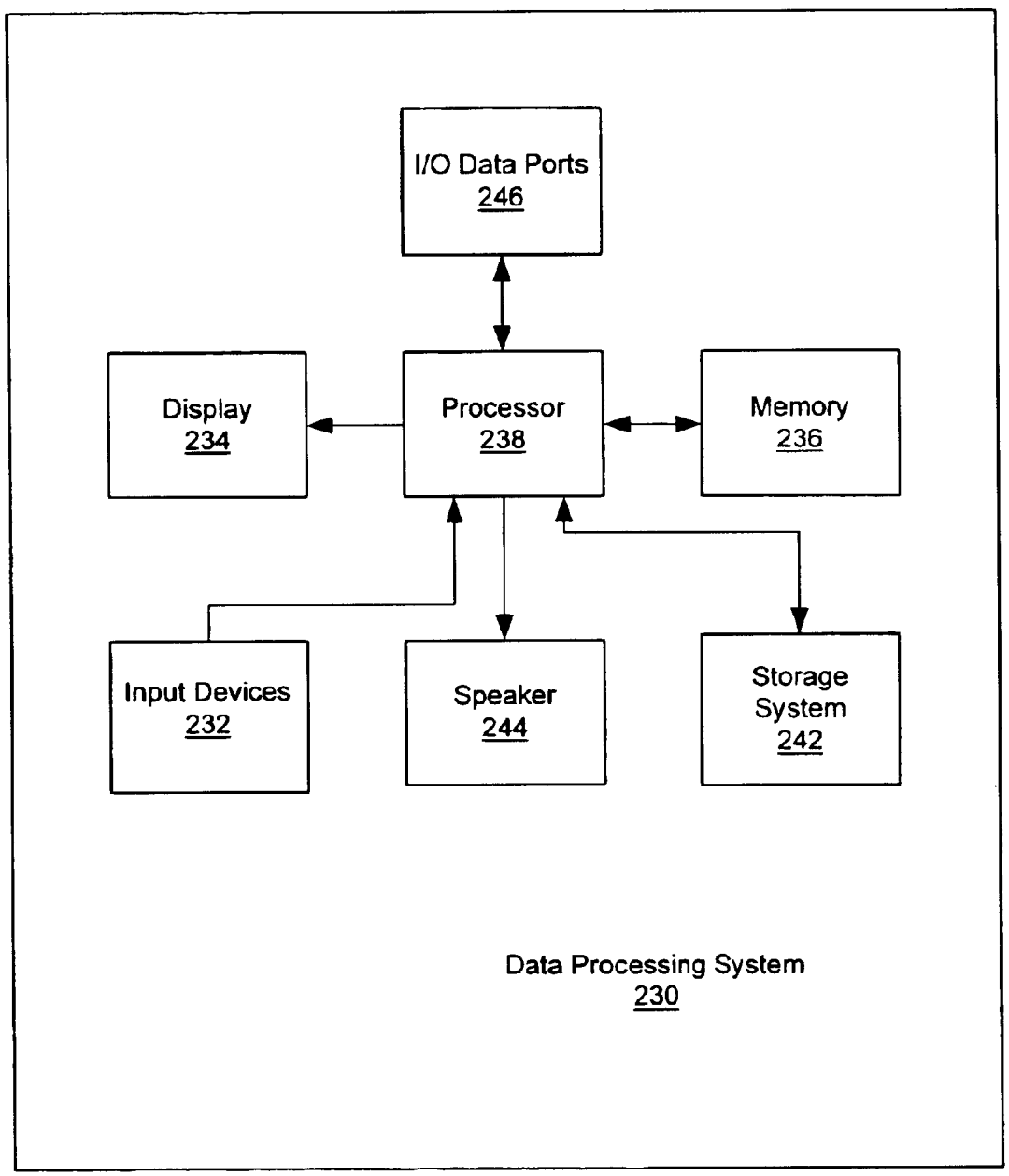
FIG. 2 is a block diagram of a data processing system suitable for use as a service quality management station or a network appliance in embodiments of the present invention.

An exemplary embodiment of a data processing system 230 suitable for use to determine a point of loss for data records in accordance with embodiments of the present invention is illustrated in FIG. 2 and typically includes input device(s) 232 such as a keyboard or keypad, a display 234, and a memory 236 that communicate with a processor 238. The data processing system 230 may further include a speaker 244, and an I/O data port(s) 246 that also communicate with the processor 230. The I/O data port(s) 246 can be used to transfer information between the data processing system 230 and another computer system or a network (e.g., the Internet) such as the communication network 100. The communication network 100 need not be an Internet Protocol network but may be a variety of known communication protocol based networks. These components may be conventional components such as those used in many conventional data processing systems which may be configured in accordance with the present invention to operate as described herein. The present invention may be utilized with any data processing systems which are capable of carrying out the operations of embodiments of the present invention described herein. The data processing system 230 may be configured as a SQMS 150 and/or a network appliance 115.

Figure 3:
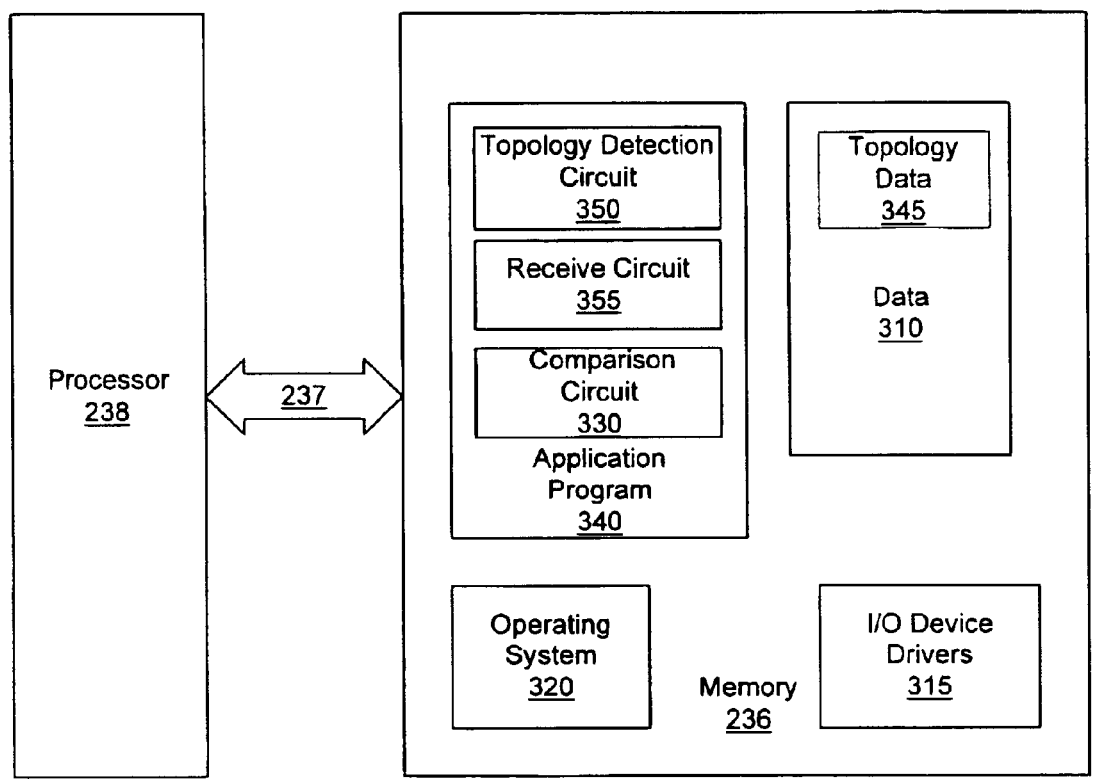
FIG. 3 is a more detailed block diagram of data processing systems providing a service quality management station according to embodiments of the present invention.

FIG. 3 is a block diagram of a data processing system that illustrates systems, methods, and computer program products in accordance with embodiments of the present invention. The processor 238 communicates with the memory 236 via an address/data bus 237. The processor 238 can be a variety of commercially available or custom microprocessors. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash, SRAM, and DRAM.

As shown in FIG. 3, the memory 236 may contain several categories of software and data used in the data processing system 230: the operating system 320; the application programs 340, the input/output (I/O) device drivers 315; and the data 310. As will be appreciated by those of skill in the art, in certain embodiments of the present invention, the operating system 320 may be a variety of operating systems suitable for use with a data processing system, such as OS/2, AIX or OS/390 from International Business Machines Corporation, Armonk, N.Y., WindowsCE, WindowsNT, Windows95, Windows98 or Windows2000 from Microsoft Corporation, Redmond, Wash., PalmOS from Palm, Inc., MacOS from Apple Computer, UNIX or Linux, proprietary operating systems or dedicated operating systems, for example, for embedded data processing systems.

The I/O device drivers 315 typically include software routines accessed through the operating system 320 by the application programs 340 to communicate with devices such as the input devices 232, the display 234, the speaker 244, the I/O data port(s) 246, and certain components of the memory 236. The application programs 340 are illustrative of the programs that implement the various features of the data processing system 230. The data 310 represents the static and dynamic data used by the application programs 340, the operating system 320, the I/O device drivers 315, and other software programs that may reside in the memory 236.

For the embodiments illustrated in FIG. 3 of the present invention, a topology detection circuit 350 is included which obtains the necessary information to identify the connecting nodes and paths between a source device and a destination device. This information may be provided, for example, by the topology data 345 which may include a topology definition for the communication network between the source and the destination which includes the connecting nodes between the two destinations defining the possible different paths data records could travel when being transmitted from the source to the destination. Alternatively, as will be understood by those of ordinary skill in the art, topology information can be initially obtained and/or updated by active communications between a service quality management station and routing devices included in the communications network which, typically, retain information describing source and destination devices connected to ports of the respective routing devices, for example, by tracking the IP address information for incoming and outgoing packets. However, the benefits of the present invention may be realized utilizing such topology information regardless of how it is obtained or updated and, accordingly, the invention is not to be limited by the source of the topology information.

As shown for the embodiments of FIG. 3, the present invention in various aspects further provides a receive circuit 355 or other receiver device that receives from a plurality of network appliances which are located at determined locations on the communication network, a number of data records originated from a source device and directed to a destination device which pass between ones of the connecting nodes during a determined time period. A comparison circuit 330 identifies one or more of the connecting nodes as a point of loss based on the received number of data records from the receive circuit 355 and the known information regarding the locations of the network appliances providing counts for numbers of data records received and the topology information defining the communication network.

While the present invention is illustrated, for example, with reference to the comparison circuit 330 being a separate program, as will be appreciated by those of skill in the art, the comparison circuit 330 (as well as the topology detection circuit 350 and the receive circuit 355) may also be incorporated into the operating system 320 or the I/O device drivers 315. Thus, the present invention should not be construed as limited to the configuration of FIG. 3 but is intended to encompass any configuration capable of carrying out the operations described herein.

Figure 4:
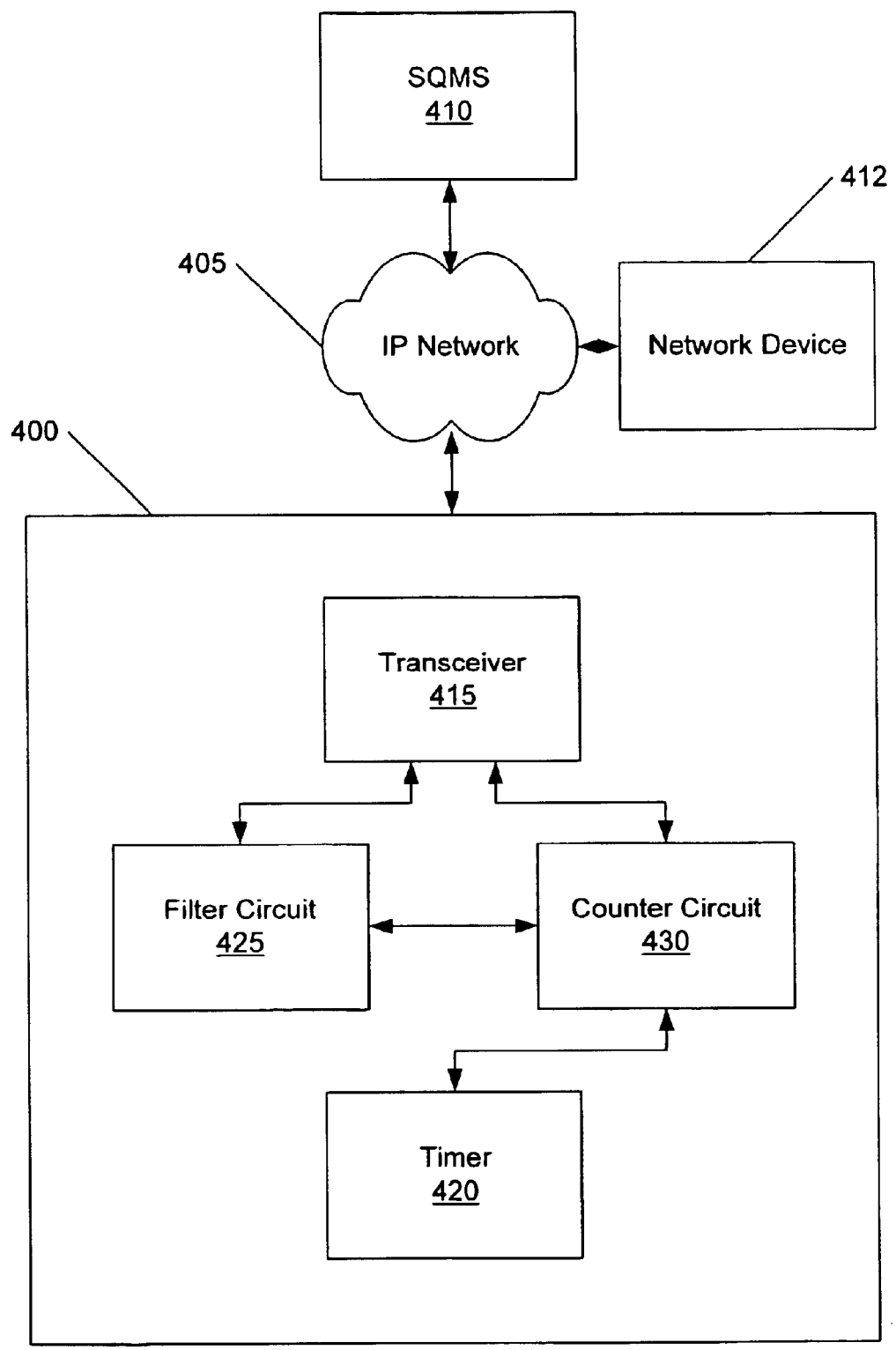
FIG. 4 is a block diagram of a network appliance according to embodiments of the present invention.

Referring now to FIG. 4, a network appliance device 400 in accordance with embodiments of the present invention will now be further described. The network appliance 400 is connected to a service quality management station 410, such as the system described with reference to FIG. 3, over the IP network 405. As shown in FIG. 4, an additional network device 412, which may be the source or the destination for various monitored data record flows, is also connected through the IP network 405. However, it is to be understood that the communication connection between the service quality management station 410 and a network appliance 400 need not be over a common network used by the network appliance 400 to detect data record flows to and from devices such as the network device 412.

The network device 412 may, for example, be a computer device operating as a server, such as the endpoint servers 105 and 108 illustrated in FIG. 1, or a client device such as the client 145 illustrated in FIG. 1. Furthermore, as noted previously in the connection with the description of FIG. 1, the server 105, the server 108 or the client 145 may operate as either a source or a destination device under various circumstances.

There will typically be a plurality of network devices 412 which are monitored as well as a plurality of network appliances 400 connected between routing devices defining connecting nodes on the communications network. Pairs of the routing devices providing connecting nodes define segments (or path portions) of the topology between a source and a destination and, in various embodiments of the present invention, at least one of the network appliances 400 is coupled between each of the pairs of connected routing devices to monitor communications therebetween. However, for purposes of the present invention, a connecting node may include a plurality of routing devices without network appliances 400 positioned between the plurality of routing devices defining a connecting node. In such configurations, the identification of a source of loss of data records will be limited to the resolution of the definition of connecting nodes. In other words, if a plurality of routing devices are grouped together to define a single connecting node for purposes of implementation of the present invention, it will not generally be expected that the individual routing device within such a plurality of devices will be determinable when such a connecting node is determined to be a point of loss for data records.

The routing devices may be routers which track data packets by both level 3 (such as IP) and/or possibly level 2 address information. However, the routing devices may alternatively be bridges and/or switch devices which do not track routed communication packets based on an IP address so long as such devices are able to provide counts filtered based upon source and destination device as will be described herein. An illustrative embodiment of the present invention including network appliance such as the network appliance 400 between each connecting node routing device is further illustrated in FIG. 5 as will be described further herein.

As shown for the embodiments of FIG. 4, the network appliance 400 includes a transceiver 415 configured to communicate with the service quality management station 410 and further to monitor communications from the network device 412 so as to obtain a count of a number of data records flowing to or from the network device 412. The illustrated network appliance 400 in FIG. 4 further includes a timer 420, a filter circuit 425 and a counter circuit 430. The filter circuit (or filter) 425 identifies ones of a plurality of data records which are detected by the network appliance 400 that are being transmitted from a source device to a destination device on the IP network 405 to provide data record counts specific to a particular source to destination data flow. The counter circuit (counter) 430 counts the filtered data records detected by the filter circuit 425. Furthermore, the timer 420 provides timing information to the counter circuit 430 which may be used to reset the counter circuit 430 to define a determined time window over which data records will be counted. Obtained counts from the counter circuit 430 may then be provided to the service quality management station 410 by the transceiver (transmitter/receiver) 415. The counts may be provided, for example, to the receiver circuit 355 illustrated in FIG. 3.

Figure 5:
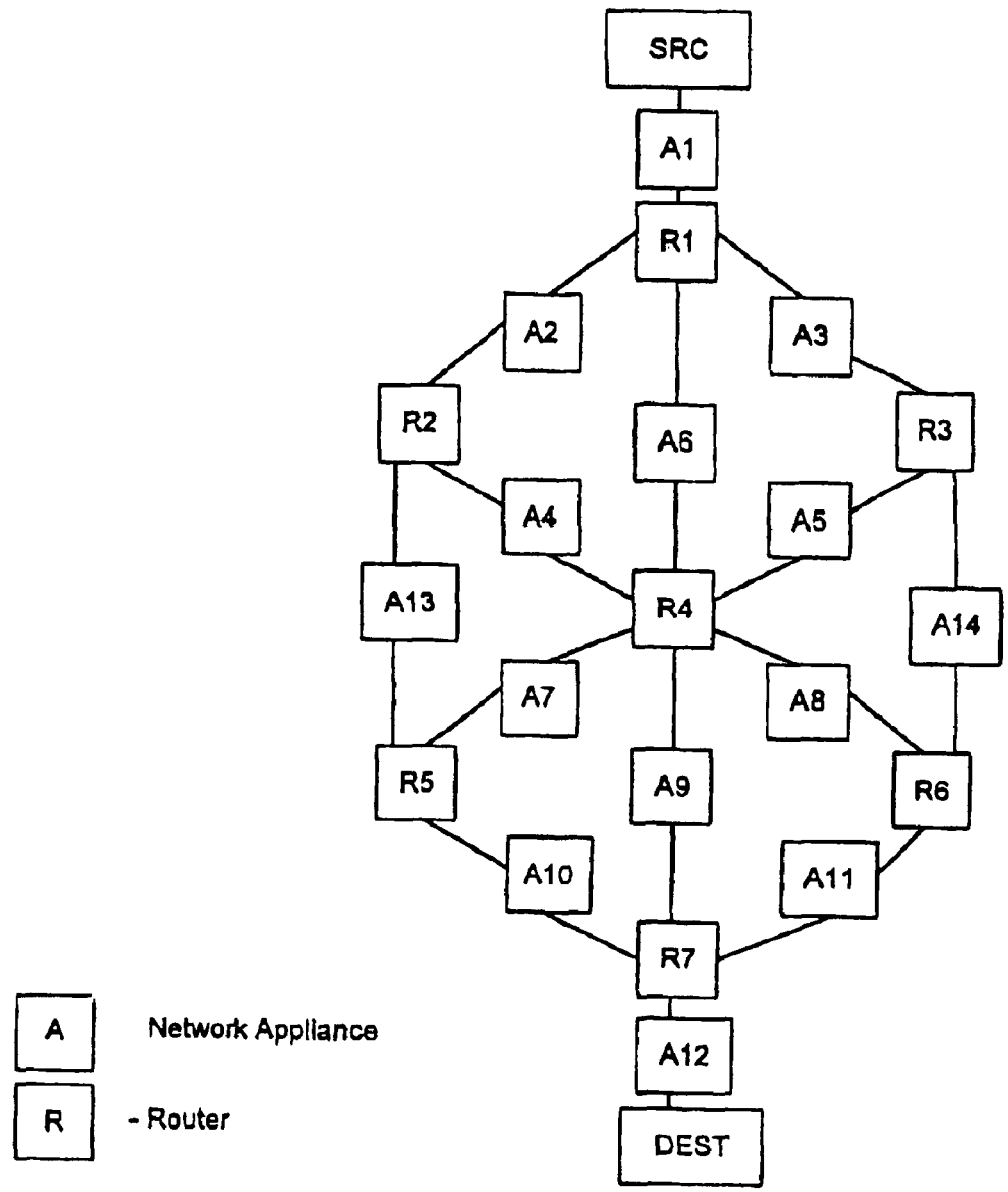
FIG. 5 is a schematic block diagram of a network topology between a source and a destination including network appliances according to embodiments of the present invention.

Referring now to FIG. 5, an exemplary network topology between a source SRC and a destination DEST will be described. The network topology includes 7 connecting nodes defined by the routers R1–R7. The network topology further includes a total of 14 network appliances A1–A14. Pairs of adjacent routers define segments or path sections of the topology between the source SRC and the destination DEST. One of the network appliances A1–A14 is coupled between each pair of routers and/or source/destination devices. For example, a network appliance A1 is coupled between the source SRC and the router R1. The network appliance A2 is connected between the router R1 and the router R2 and so on. As used herein, the term "coupled between" includes logically coupled, such as in embodiments in which the network appliances are, for example, implemented on the routing devices defining the nodes, as well as physically coupled, as in embodiments where the network appliances are distinct physical devices physically positioned between routing devices on the network. The network appliances A1–A14 are configured to monitor data transmitted on the network segment to which they are connected. In various embodiments of the present invention the network appliances A1–A14 collect data record information such as numbers of packets transmitted, numbers of packets received and numbers of packets dropped. Information may be collected by the network appliances A1–A14 in specified time window buckets, such as one minute buckets.

It is to be understood that other source SRC and destination DEST devices may be coupled to the communications network which similarly transmit data packets through various of the routers R1–R7 which communication flows may also be monitored by the network appliances A1–A14. Accordingly, in various embodiments of the present invention, the network appliances A1–A14 are configured to collect data for specific flows, such as data being transmitted from a specific source SRC to a specific destination DEST. The routers R1–R7 are typically configured to route data from an in incoming segment of the communication network to an appropriate outgoing segment based upon routing information maintained by the respective routers R1–R7. Such routing information is typically maintained in a table called a routing table.

For purposes of the description of operations for various embodiments of the present invention herein, utilizing the illustrated topology of FIG. 5, it is to be understood that the illustrated topology information identifies all possible paths between the source SRC and destination DEST and the relationship between routers and network appliances on those paths. It is also to be understood that, in various embodiments, the count information from the network appliances may be provided from current counters or, alternatively, from stored prior period counts. It is further to be understood that means may be provided for synchronizing the time reference of the network appliances A1–A14 to facilitate monitoring of comparable data flows over the communications network. In various embodiments, the routers R1–R7 will typically further be configured to provide information, such as interface statistics and routing table information, to a service quality management station 150, 410. The examples provided herein with reference to the topology shown in FIG. 5 will further assume that the various paths between the source SRC and the destination DEST do not allow loop data flows (i.e., data record flow will all be downstream wherein the source SRC is the upstream reference and the destination DEST is the downstream reference.) However, it is to be understood that the present invention may be utilized with complex routings so long as upstream is understood to refer to the source SRC side and downstream is understood to refer to the destination DEST side for data record flow counting along each segment so as to allow a determination of expected input and/or output data flows at various network appliances A1–A14 included in the network topology.

Figure 6:
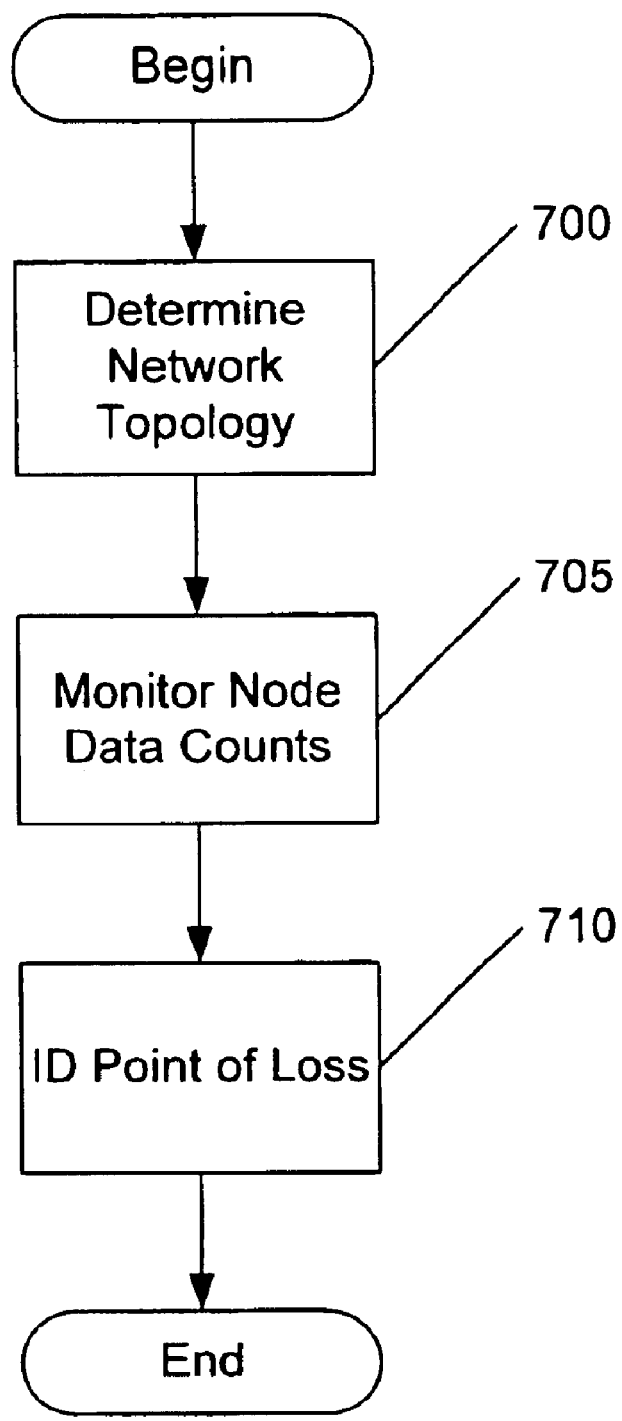
FIG. 6 is a flowchart illustrating operations for determining a point of loss for data records according to embodiments of the present invention.
Figure 7:
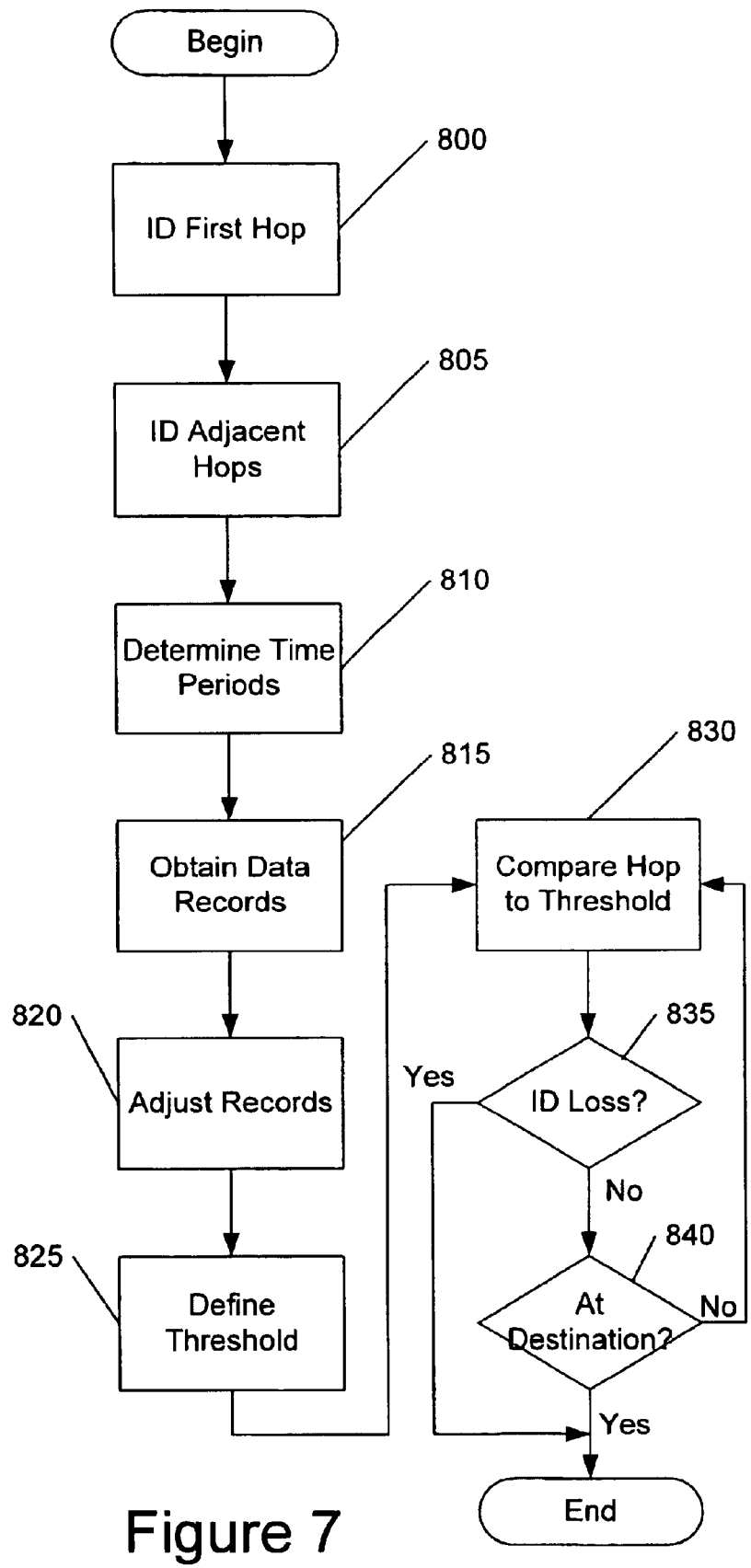
FIG. 7 is a flowchart illustrating operations for determining a point of loss for data records according to further embodiments of the present invention.

Referring now to FIGS. 6 and 7, operations related to determining a point of loss for data records to be communicated between a source SRC and a destination DEST on a communication network will now be further described for various embodiments of the present invention. As shown in the embodiments illustrated in FIG. 6, operations begin at block 700 with determination of the topology of the communication network between the source SRC and the destination DEST including the plurality of connecting nodes therebetween. A number of data records from the source SRC directed to the destination DEST passing between respective ones of the connecting nodes is monitored during a determined period of time (block 705). Such monitoring may include the service quality management station 125, 410 identifying one or more of the network appliances A1–A14 on the topology between the source SRC and the destination DEST and obtaining the number of data records from the source SRC directly to the destination DEST during the determined time period from the respective one or more network appliances A1–A14. If a problem is encountered in the network causing data records to be lost during transmission between the source SRC and the destination DEST, one or more of the connecting nodes R1–R7 is identified as the point of loss based on the monitored number of data records provided by the network appliances A1–A14 and the determined topology of the communications network. The identification of the point of loss may generally be understood as isolating a connecting node R1–R7 for which the inflows of data between the source SRC and the destination DEST does not correspond to the outflow of data from the source SRC to the destination DEST as will be more fully described with respect to particular examples herein.

Operations will now be described further with reference to the embodiments illustrated in FIG. 7 beginning with identification of at least one first hop one of the network appliances which is coupled to the source over the communication network (block 800). For example, referring to FIG. 5, the network appliance A1 defines a first hop one of the network appliances A1–A14 with reference to the source SRC. Adjacent (or next hop) ones of the network appliances coupled between the first hop one of the network appliances and the destination DEST are identified (block 805). For example, referring to FIG. 5, network appliances A2 and A3 are located downstream of the first hop network appliance A1 between network appliance A1 and the destination DEST.

The generation of counts of a number of data records passing between the source SRC and the destination DEST at various hops or steps along the network topology as described herein is measured over a finite time period which is determined for purposes of the analysis. In one optional aspect of the illustrated embodiments of FIG. 7, the determined period of time for counting data records is defined for respective hops in the network topology progressively further downstream from the source SRC based on a delay between the respective ones of the network appliances A1–A14 in the path between the source SRC and the destination DEST rather than utilizing a fixed time period for each based on reference to a time synchronization reference point. The delay may be determined based on a network model, assumptions, or information obtained from the routing devices and/or network appliances. The time period shift between respective ones of the network appliances along the path between the source SRC and the destination DEST may, for example, be based on an average delay between respective ones of the network appliances which average delay, in turn, may be determined over a specified averaging window or time period. Alternatively, a fixed time period without relative start and stop time shifts may be utilized by otherwise accounting for differences in arrival time of specific data records. For example, analysis operations to identify the source of loss of data packets as described herein could be executed during a period of substantially uniform transmission of data records between the source SRC and the destination DEST to provide consistent rate measurements at various stages in the path. Where a variable time delay is applied for defining different start times for the determined period of time for obtaining counts of data records, the counts could be individually referenced between the first hop network appliance A1 and each downstream respective device. Alternatively, an expected average display per hop could be utilized and multiplied for respective ones of the downstream network appliances based upon the number of hops displaced in the network location each network appliance is from the source SRC.

As shown in the embodiment of FIG. 5, the first hop one of the network appliances A1 is coupled to the source SRC without intervening ones of the network appliances being coupled between the source SRC and the first hop one of the network appliances A1. Furthermore, the next hop ones of the network appliances A2, A3 are coupled between the first hop network appliance A1 and the destination DEST without intervening ones of the network appliances being coupled therebetween.

A count of the number of data records from the source directed to the destination obtained by the first node network appliances A1, A2, A3 during the determined time period is obtained by the service quality management station 125, 410 (block 815). As shown in the illustration of FIG. 8, these obtained counts of numbers of data records may, optionally, be adjusted to compensate for in transit introduced changes to data records (block 820). For example, the obtained numbers of data records may be adjusted to compensate for encryption related changes in data records introduced by a connecting node coupled between successive ones of the network appliances. With reference to FIG. 5, for example, if encryption was introduced by the router R1 which increased the volume of data by a known factor, the data record number counts from the network appliance A1 could be adjusted upward accordingly or the numbers from network appliances A2 and A3 could be adjusted downwardly accordingly to remove the effects of encryption overhead from the analysis of conservation of flow of the data records.

A threshold amount for use in comparing input and output data flows with reference to a connecting node, such as the routing device R1, may be established (block 825). For example, the threshold amount defining an allowable inequality between input flows and output flows for a connecting routing device may be established based on an expected timing related variability between numbers of data records obtained by respective ones of the network appliances A1–A14. The threshold amount could further be established based on a percentage of data record throughput for respective ones of the network appliances A1–A14. However, it is also to be understood that a default value of zero (i.e., the number of data records in is required to equal the number of data records out for purposes of comparison) or higher could be established in advance and not further adjusted.

The number of data records from the source SRC directed to the destination DEST obtained by a first hop one of the network appliances (such as A1) is then compared with the number of data records from the source SRC directed to the destination DEST obtained by ones of the next hop network appliances coupled between the first hop network appliance and the destination (such as network appliances A2 and A3) (block 830). The results of the comparison may be used to determine if the counts obtained from the first hop network appliance (such as A1) differ by the threshold amount or more from the number of data records from the source SRC directed to the destination DEST obtained by the next hop network appliances (such as network appliances A2, A3).

If a difference exceeding the threshold amount is identified (block 835), then the intervening connecting node (such as R1) is identified as a point of loss for data records. In a typical communication network environment, path joinder may cause data outflows from a routing device to be greater than data inflows from an individual upstream device. Accordingly, the described threshold amounts and comparison should be understood as specifying detection of outflows less than inflows, not greater than inflows, by the threshold amount.

As shown in FIG. 7, operations may cease on detection of a point of loss (block 835). However, in alternative embodiments of the present invention where it is desirable to determine if there are a plurality of connecting nodes which are a point of loss for data records, operations continue even after a point of loss connecting node is identified to identify any additional points of loss. If the data records from the input and output side network appliances (such as A1, A2 and A3) for a connecting node do not differ by an amount exceeding the threshold amount, the respective connecting node (such as R1) is not identified as a point of loss (block 835). It is then determined if operations have already been processed through all hops to the destination DEST (such as completing counts for network appliance A1–A14 thus, checking all the connecting node routing devices R1–R7 between the source SRC and the destination DEST) (block 840). If not, operations return to block 830 and proceed as described previously. Operations would similarly proceed back to block 830 regardless of early identification of a point of loss connecting node if it is desired to characterize performance of the entire path.

While operations have been described with reference to hop by hop count comparisons flowing from the upstream source SRC through the downstream destination DEST location, operations need not proceed in such a manner, but, instead, may proceed in any desired order so long as data is collected for comparison which identifies each of the input and output paths for data records passing between the source SRC and destination DEST for each respective connecting node routing device to be analyzed. Furthermore, the order of analysis need not be connected with the order of obtaining the data record counts for analysis from the respective network appliances A1–A14. Such data may be gathered in whatever order or sequence is most convenient for the service quality management station 125, 410 and may further be collected in response to a triggering event such as a user request, a detected network performance degradation or identified problem, or a routine time scheduled initiation of an analysis. The data comparison once the records are obtained from the respective network appliances A1–A14 may proceed in a variety of known sequences at the service quality management station 125, 410 including either sequential or parallel processing as will be understood by those of skill in the art. Accordingly, terminology related to first hop and next hop ones of the network appliances A1–A14 and upstream and downstream directions merely refers to the tracking of incoming and outgoing data flows respectively for comparison at ones of the connecting nodes.

To further facilitate understanding of operations according to various embodiments of the present invention, an example will now be provided based on the network topology illustrated in FIG. 5 and the data record traffic count going through the network during a determined period of time as defined by Table 1 below. Table 1 indicates flows for respective hops expressed in average bits per second for 3 determined time frames T1, T2 and T3 as shown by the respective columns. The numerical values shown in parenthesis in Table 1 under Columns T1 and T3 indicate average bits per second which should have been identified at respective ones of the network appliances if the network was functioning properly. As indicated by the A1–A14 reference in the "Network Appliance" column of Table 1, the rows show the counts obtained from the respective ones of the network appliances A1–A14 as shown in FIG. 5.

TABLE 1

| Network Appliance | T1 | T2 | T3 |
|---|---|---|---|
| A1 (S->R1) | 1000 | 1000 | 1000 |
| A2 (R1->R2) | 700 | 1000 | 600 |
| A3 (R1->R3) | 0 | 0 | 0 |
| A4 (R2->R4) | 400 | 1000 | 300 |
| A5 (R3->R4) | 0 | 0 | 0 |
| A6 (R1->R4) | 300 | 0 | 400 |
| A7 (R4->R5) | 0 | 0 | 0 |
| A8 (R4->R6) | 0 | 0 | 400 |
| A9 (R4->R7) | 700 | 1000 | 300 |
| A10 (R5->R7) | 100(300) | 0 | 50(300) |
| A11 (R6->R7) | 0 | 0 | 400 |
| A12 (R7->D) | 800(1000) | 1000 | 750(1000) |
| A13 (R2->R5) | 300 | 0 | 300 |
| A14 (R3->R6) | 0 | 0 | 0 |

As will now be described further with respect to analysis of the data shown in Table 1 according to embodiments of the present invention, operations essentially utilize the current traffic information as provided in Table 1 from a network appliance at a first hop (or displacement) from the source SRC and compare the data with accumulated traffic information gathered from each of the next hop (downstream adjacent) network appliances. If the respective values compare favorably, for example, within a defined error range allowed by the threshold amount, then operations continue with additional ones of the path segments for which data records are detected as being passed on their way to the destination. Path searching as described with reference to FIG. 7 may cease once a problem is identified or continue until completed in case there are more than one problem devices in the network. In addition, input and output data flows may be maintained for each router R1–R7 during analysis which may be utilized for verification purposes to confirm that all data was properly handled.

Referring again to the circumstances indicated by the data in column T1 of Table 1, 1000 bits per second of data records are detected as leaving from the source SRC addressed to the destination DEST while only 800 bits per second are detected as arriving at the destination DEST. While count values are expressed, for purposes of this example, as normalized to a bits per second form, the analysis could similarly be applied using total bit counts over a defined window. For purposes of this example, the data obtained, as indicated in Table 1, for time period T1 will be analyzed on a hop by hop basis, starting with the upstream network appliance A1 located closest to the source SRC. This first step analysis is illustrated in Table 2 below:

TABLE 2

| Appliance Path | Rate | Router | Next Appliance | Next Rate | Notes |
|---|---|---|---|---|---|
| A1 | 1000 | R1 | | | |
| | | | A2 | 700 | New Path |
| | | | A6 | 300 | New Path |
| | | | A3 | 0 | |
| | | | | 1000 | Total, no loss |

As shown in Table 2, the source SRC is detected as sending 1000 bits per second at network appliance A1 which passes to router R1. The next hop appliances downstream of the router R1 include network appliances A2, A6 and A3. In other words, data from the source SRC entering the router R1 could pass through any one of three alternative paths and be routed successfully to the destination DEST. Thus, the respective measured bit per second rate information for each of these next hop appliances is recorded as illustrated in the "Next Rate" column of Table 2 as data is detected between the source SRC and the destination DEST. The Notes column indicates that 2 new paths are introduced by the output from the router R1 as a data rate of 0 is shown for network appliance A3. The Notes column indicates that the total rate of flows detected at the downstream appliances matches the rate detected at the upstream appliance, indicating no loss of data records at the router R1. This conclusion with respect to the first connecting node router R1 is shown in the router summary Table 3 below:

TABLE 3

| Router | Input | Output | Notes |
|---|---|---|---|
| R1 | 1000 | 1000 | Added |

Comparison operations continue then with reference to each of the respective new paths through network appliance A2, shown in Table 4, and network appliance A6, shown in Table 5. The information presented in the respective tables may be analyzed as described previously with reference to Table 2. Thus, two new next appliance paths through network appliances A4 and A13 are identified in Table 4 and no data loss is indicated for the router R2.

TABLE 4

| Appliance Path | Rate | Router | Next Appliance | Next Rate | Notes |
|---|---|---|---|---|---|
| A2 | 700 | R2 | | | |
| | | | A4 | 400 | New Path |
| | | | A13 | 300 | New Path |
| | | | | 700 | Total, no loss |

TABLE 5

| Appliance Path | Rate | Router | Next Appliance | Next Rate | Notes |
|---|---|---|---|---|---|
| A6 | 700 | R4 | | | |
| | | | A7 | 0 | |
| | | | A9 | 700 | New Path |
| | | | A8 | 0 | |
| | | | | 700 | Total, extra data, paths joined |

Table 5 indicates only one output network appliance A9 receiving data flows and indicating a new path. It further indicates that the output flows from the router R4 exceed the input flows which indicates the router R4 is a path join point as contrasted with a shortfall which would indicate a loss of data packets. The summary information for the respective routers R2 and R4 are added to that provided for router R1 as shown in Table 6.

TABLE 6

| Router | Input | Output | Notes |
|---|---|---|---|
| R1 | 1000 | 1000 | |
| R2 | 700 | 700 | Added |
| R4 | 300 | 700 | Added |

The analysis for the next hop based on identified next hop network appliances A4, A13 and A9 is shown in Tables 7, 8 and 9 respectively. The information contained in these respective tables may be analyzed using the same way as described previously with respect to Tables 2, 4 and 5. Thus, a comparison of the data rates for appliance A13 and the combined total data rate for next hop appliances A7 and A10 indicates a data loss problem with the router R5 (Table 8). Routers R4 (Table 7) and R7 (Table 9) show input rates lower than output rates indicating that each is part of a joined path.

TABLE 7

| Appliance Path | Rate | Router | Next Appliance | Next Rate | Note |
|---|---|---|---|---|---|
| A4 | 400 | R4 | | | |
| | | | A7 | 0 | |
| | | | A9 | 700 | Already Processed, Rtr Tbl |
| | | | A8 | 0 | |
| | | | | 700 | Total, extra data, paths joined |

TABLE 8

| Appliance Path | Rate | Router | Next Appliance | Next Rate | Notes |
|---|---|---|---|---|---|
| A13 | 300 | R5 | | | |
| | | | A7 | 0 | |
| | | | A10 | 100 | New Path |
| | | | | 100 | Total, Data Loss, Problem R5 |

TABLE 9

| Appliance Path | Rate | Router | Next Appliance | Next Rate | Notes |
|---|---|---|---|---|---|
| A9 | 700 | R7 | | | |
| | | | A12 | 800 | Done |
| | | | | 800 | Total, extra data, paths joined |

The results of the analysis of Tables 7–9 are added to the router table, Table 6, as indicated in Table 10 below:

TABLE 10

| Router | Input | Output | Notes |
|---|---|---|---|
| R1 | 1000 | 1000 | |
| R2 | 700 | 700 | |
| R4 | 700 | 700 | Updated |
| R5 | 300 | 100 | Added |
| R7 | 700 | 800 | Added |

Finally, the only identified next network appliance A10 from Tables 7–9 is evaluated as shown in Table 11 indicating a path joiner. The results from this step are then added to the router table as illustrated in Table 12:

TABLE 11

| Appliance Path | Rate | Router | Next Appliance | Next Rate | Notes |
|---|---|---|---|---|---|
| A10 | 100 | R7 | | | |
| | | | A12 | 800 | Done |
| | | | | 800 | Total, extra data, paths joined |

TABLE 12

| Router | Input | Output | Notes |
|---|---|---|---|
| R1 | 1000 | 1000 | |
| R2 | 700 | 700 | |
| R4 | 700 | 700 | |
| R5 | 300 | 100 | |
| R7 | 800 | 800 | Added |

Note that, as a result of paths being joined, respective data for various ones of the routers may be updated at each stage. For example, in Table 6, the accumulated total flows for the router R4 indicated an input of 300 and an output of 700 while, in Table 10, the router R4 has an indicated input of 700 and an output of 700. The 400 bit per second rate of network appliance A4, shown in Table 7, is added to the 300 bits per second rate from network appliance A6, shown in Table 5 to provide this result for the router. The information with reference to the router R7 is similarly updated as shown in Table 12. Thus, information related to knowledge of the network topology is illustrated in FIG. 5, including knowledge of the respective positions of each of the network appliances A1–A14, is used, in addition to the data record count information, to complete the analysis of performance for each of the respective routers R1–R7. The evaluation based on these results for each of the respective routers R1, R2, R4, R5 and R7 which supported data flows in the example described herein are summarized in Table 13 below:

TABLE 13

| Router | Input | Output | Notes |
|---|---|---|---|
| R1 | 1000 | 1000 | Good |
| R2 | 700 | 700 | Good |
| R4 | 700 | 700 | Good |
| R5 | 300 | 100 | Data Loss, Interrogate Router for more data |
| R7 | 800 | 800 | Good |

Thus, it would appear that only the router R5 was experiencing data loss. Subsequent operations may proceed related to identifying the cause for the data loss at the router R5. Various techniques will be understood by those of skill in the art for analyzing a device which has been identified as the root cause for a problem, such as polling for more information from the router to aid in determining the cause. Such polled information could include router statistics, link statistics, such as utilization, drop packets information, error records, etc. Such further analysis is beyond the scope of the present invention and will not be further described herein.

The flowcharts and block diagrams of FIGS. 1 through 7 illustrate the architecture, functionality, and operation of possible implementations providing for determining a point of loss for data records on a communication network according to various embodiments of the present invention. In this regard, each block in the flow charts or block diagrams represents a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may in fact be executed substantially concurrently or the blocks may sometimes be executed in the reverse order, depending upon the functionality involved. Furthermore, in certain embodiments of the present invention, such as object oriented programming embodiments, the sequential nature of the flowcharts may be replaced with an object model such that operations and/or functions may be performed in parallel or sequentially.

Furthermore, fewer or more functions may be provided as well as functions which are identified as separate functions may be combined while still coming within the teachings of the present invention. For example, the topology detection circuit 350 is shown as a single application, however, this application could be two or more applications. Similarly, the topology detection circuit 350, the receive circuit 355 and the comparison circuit 330 may be combined in a single application. Thus, the present invention should not be construed as limited to the specific configurations illustrated but is intended to cover all configurations which may carry out the operations described herein.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for determining a point of loss for data records to be communicated between a source and a destination on a communication network, the method comprising the steps of:

determining a topology of the communication network between the source and the destination, the topology including a plurality of connecting nodes;

monitoring a number of data records from the source directed to the destination passing between ones of the connecting nodes during a determined period of time; and identifying at least one of the connecting nodes as the point of loss based on the monitored number of data records and the determined topology;

wherein a plurality of network appliances configured to obtain a number of data records passing between a pair of connecting nodes during a time period are positioned between respective ones of the connecting nodes, and wherein the monitoring step further comprises the steps of:

identifying at least one of the network appliances on the topology; and obtaining the number of data records from the source directed to the destination obtained by the identified at least one network appliance during the determined period of time; and wherein the steps of identifying at least one of the network appliances on the topology and obtaining the number of data records from the source directed to the destination obtained by the identified at least one network appliance during the determined period of time further comprise the steps of:

identifying at least one first hop one of the network appliances which is coupled to the source over the communication network;

identifying at least one next hop one of the network appliances which is coupled between the at least one first hop one of the network appliances and the destination;

obtaining a number of data records from the source directed to the destination obtained by the at least one first hop one of the network appliances and the at least one next hop one of the network appliances during the determined time period; and wherein the step of identifying at least one of the connecting nodes as the point of loss further comprises the steps of:

comparing the number of data records from the source directed to the destination obtained by one of the at least one first hop one of the network appliances with the number of data records from the source directed to the destination obtained by ones of the at least one next hop one of the network appliances coupled between the one of the at least one first hop one of the network appliances and the destination; and identifying a connecting node positioned between the at least one first hop one of the network appliances and the ones of the at least one next hop one of the network appliances as the point of loss for data records if the number of data records from the source directed to the destination obtained by one of the at least one first hop one of the network appliances differs by a threshold amount from the number of data records from the source directed to the destination obtained by ones of the at least one next hop one of the network appliances coupled between the one of the at least one first hop one of the network appliances and the destination.

2. The method of claim 1, wherein the at least one first hop one of the network appliances is coupled to the source without intervening ones of the network appliances being coupled between the source and the first hop one of the network appliances and wherein the at least one next hop one of the network appliances is coupled between the at least one first hop one of the network appliances and the destination without intervening ones of the network appliances being coupled between the at least one first hop one of the network appliances and the at least one next hop one of the network appliances.

3. The method of claim 1, wherein the step of comparing the number of data records from the source directed to the destination obtained by one of the at least one first hop one of the network appliances with the number of data records from the source directed to the destination obtained by ones of the at least one next hop one of the network appliances coupled between the one of the at least one first hop one of the network appliances and the destination further comprises the step of comparing a number of data records from the source directed to the destination obtained by an upstream one of the network appliances with a number of data records from the source directed to the destination obtained by at least one downstream one of the network appliances coupled between the upstream one of the network appliances and the destination at an adjacent downstream position for successive ones of the network appliances until at least one of the destination is reached or at least one of the connecting nodes is identified as the point of loss for data records and wherein the step of identifying a connecting node positioned between the at least one first hop one of the network appliances and the ones of the at least one next hop one of the network appliances as the point of loss for data records comprises the step of identifying a connecting node positioned between the upstream one of the network appliances and corresponding downstream ones of the network appliances as the point of loss for data records if the number of data records from the source directed to the destination obtained by the upstream one of the network appliances differs by a threshold amount from the number of data records from the source directed to the destination obtained by the corresponding downstream ones of the network appliances.

4. The method of claim 3 wherein the step of comparing a number of data records from the source directed to the destination obtained by an upstream one of the network appliances with a number of data records from the source directed to the destination obtained by at least one downstream one of the network appliances coupled between the upstream one of the network appliances and the destination at an adjacent downstream position is repeated for successive ones of the network appliances on the topology until the destination is reached and wherein the step of identifying at least one of the connecting nodes as the point of loss further comprises the step of identifying all connecting nodes positioned between upstream ones of the network appliances and corresponding downstream ones of the network appliances as points of loss for data records if the number of data records from the source directed to the destination obtained by respective upstream ones of the network appliances differs by a threshold amount from the number of data records from the source directed to the destination obtained by corresponding downstream ones of the network appliances.

5. The method of claim 1 further comprising the step of adjusting obtained numbers of data records from the source directed to the destination to compensate for in transit introduced changes to data records before comparing the number of data records from the source directed to the destination obtained by one of the at least one first hop one of the network appliances with the number of data records from the source directed to the destination obtained by ones of the at least one next hop one of the network appliances coupled between the one of the at least one first hop one of the network appliances and the destination.

6. The method of claim 5 wherein the step of adjusting obtained numbers of data records comprises the step of adjusting obtained numbers of data records from the source directed to the destination to compensate for encryption related changes in data records introduced by a connecting node coupled between the a first hop one and at least one next hop one of the network appliances.

7. The method of claim 1 further comprising the step of defining the determined period of time for the at least one first hop one of the network appliances and the at least next hop one of the network appliances based on a delay between the at least one first hop one of the network appliances and the at least next hop one of the network appliances.

8. The method of claim 7 wherein the step of defining the determined time period further comprises the step of defining the determined period of time for the at least one first hop one of the network appliances and the at least next hop one of the network appliances based on an average delay between the at least one first hop one of the network appliances and the at least next hop one of the network appliances determined over an averaging window.

9. The method of claim 1 further comprising the step of defining the threshold amount based on an expected timing related variability between numbers of data records obtained by ones of the network appliances.

10. The method of claim 9 wherein the step of defining the threshold amount further comprises the step of defining the threshold amount based on a percentage of data record throughput for respective ones of the network appliances.

11. The method of claim 1 wherein the connecting nodes are routing devices selected from the group consisting of routers, bridges and switches.

12. The method of claim 1 wherein a network appliance is positioned between each defined connecting node in the topology and all other adjacent defined connecting nodes in the topology.

13. The method of claim 12 wherein at least one of the defined connecting nodes comprises a plurality of routing devices.

14. A system for determining a point of loss for data records to be communicated between a source and a destination on a communication network, the system comprising:
   means for determining a topology of the communication network between the source and the destination, the topology including a plurality of connecting nodes;
   means for monitoring a number of data records from the source directed to the destination passing between ones of the connecting nodes during a determined period of time;
   means for identifying at least one of the connecting nodes as the point of loss based on the monitored number of data records and the determined topology;
   a plurality of network appliances configured to obtain a number of data records passing between a pair of connecting nodes during a time period, ones of the network appliances being positioned between respective ones of the connecting nodes,
   wherein the means for monitoring further comprises:
      means for identifying at least one of the network appliances on the topology; and
      means for obtaining the number of data records from the source directed to the destination obtained by the identified at least one network appliance during the determined period of time; and
   wherein the means for identifying at least one of the network appliances on the topology and the means for obtaining the number of data records from the source directed to the destination obtained by the identified at least one network appliance during the determined period of time further comprise:
      means for identifying at least one first hop one of the network appliances which is coupled to the source over the communication network;
      means for identifying at least one next hop one of the network appliances which is coupled between the at least one first hop one of the network appliances and the destination;
      means for obtaining a number of data records from the source directed to the destination obtained by the at least one first hop one of the network appliances and the at least one next hop one of the network appliances during the determined time period; and
   wherein the means for identifying at least one of the connecting nodes as the point of loss further comprises:
      means for comparing the number of data records from the source directed to the destination obtained by one of the at least one first hop one of the network appliances with the number of data records from the source directed to the destination obtained by ones of the at least one next hop one of the network appliances coupled between the one of the at least one first hop one of the network appliances and the destination; and
      means for identifying a connecting node positioned between the at least one first hop one of the network appliances and the ones of the at least one next hop one of the network appliances as the point of loss for data records if the number of data records from the source directed to the destination obtained by one of the at least one first hop one of the network appliances differs by a threshold amount from the number of data records from the source directed to the destination obtained by ones of the at least one next hop one of the network appliances coupled between the one of the at least one first hop one of the network appliances and the destination.

15. The system of claim 14 wherein the at least one first hop one of the network appliances is coupled to the source without intervening ones of the network appliances being coupled between the source and the first hop one of the network appliances and wherein the at least one next hop one of the network appliances is coupled between the at least one first hop one of the network appliances and the destination without intervening ones of the network appliances being coupled between the at least one first hop one of the network appliances and the at least one next hop one of the network appliances.

16. The system of claim 14 wherein the means for comparing the number of data records from the source directed to the destination obtained by one of the at least one first hop one of the network appliances with the number of data records from the source directed to the destination obtained by ones of the at least one next hop one of the network appliances coupled between the one of the at least one first hop one of the network appliances and the destination further comprises means for comparing a number of data records from the source directed to the destination obtained by an upstream one of the network appliances with a number of data records from the source directed to the destination obtained by at least one downstream one of the network appliances coupled between the upstream one of the network appliances and the destination at an adjacent downstream position for successive ones of the network appliances until at least one of the destination is reached or at least one of the connecting nodes is identified as the point of loss for data records and wherein the means for identifying a connecting node positioned between the at least one first hop one of the network appliances and the ones of the at least one next hop one of the network appliances as the point of loss for data records comprises means for identifying a connecting node positioned between the upstream one of the network appliances and corresponding downstream ones of the network appliances as the point of loss for data records if the number of data records from the source directed to the destination obtained by the upstream one of the network appliances differs by a threshold amount from the number of data records from the source directed to the destination obtained by the corresponding downstream ones of the network appliances.

17. The system of claim 16 wherein the means for comparing a number of data records from the source directed to the destination obtained by an upstream one of the network appliances with a number of data records from the source directed to the destination obtained by at least one downstream one of the network appliances coupled between the upstream one of the network appliances and the destination at an adjacent downstream position is configured to compare successive ones of the network appliances on the topology until the destination is reached and wherein the means for identifying at least one of the connecting nodes as the point of loss further comprises means for identifying all connecting nodes positioned between upstream ones of the network appliances and corresponding downstream ones of the network appliances as points of loss for data records if the number of data records from the source directed to the destination obtained by respective upstream ones of the network appliances differs by a threshold amount from the number of data records from the source directed to the destination obtained by corresponding downstream ones of the network appliances.

18. The system of claim 14 further comprising means for adjusting obtained numbers of data records from the source directed to the destination to compensate for in transit introduced changes to data records before comparing the number of data records from the source directed to the destination obtained by one of the at least one first hop one of the network appliances with the number of data records from the source directed to the destination obtained by ones of the at least one next hop one of the network appliances coupled between the one of the at least one first hop one of the network appliances and the destination.

19. The system of claim 18 wherein the means for adjusting obtained numbers of data records comprises means for adjusting obtained numbers of data records from the source directed to the destination to compensate for encryption related changes in data records introduced by a connecting node coupled between the a first hop one and at least one next hop one of the network appliances.

20. The system of claim 14 further comprising means for defining the determined period of time for the at least one first hop one of the network appliances and the at least next hop one of the network appliances based on a delay between the at least one first hop one of the network appliances and the at least next hop one of the network appliances.

21. The system of claim 20 wherein the means for defining the determined time period further comprises means for defining the determined period of time for the at least one first hop one of the network appliances and the at least next hop one of the network appliances based on an average delay between the at least one first hop one of the network appliances and the at least next hop one of the network appliances determined over an averaging window.

22. The system of claim 14 further comprising means for defining the threshold amount based on an expected timing related variability between numbers of data records obtained by ones of the network appliances.

23. The system of claim 22 wherein the means for defining the threshold amount further comprises means for defining the threshold amount based on a percentage of data record throughput for respective ones of the network appliances.

24. The system of claim 14 wherein the connecting nodes are routing devices selected from the group consisting of routers, bridges and switches.

25. The system of claim 14 wherein a network appliance is positioned between each defined connecting node in the topology and all other adjacent defined connecting nodes in the topology.

26. The system of claim 25 wherein at least one of the defined connecting nodes comprises a plurality of routing devices.

27. A computer program product for determining a point of loss for data records to be communicated between a source and a destination on a communication network based on a topology of the communication network between the source and the destination, the topology including a plurality of connecting nodes, the computer program product comprising:

a computer-readable storage medium having computer-readable program code embodied in said medium, said computer-readable program code comprising:
   computer-readable program code which monitors a number of data records from the source directed to the destination passing between ones of the connecting nodes during a determined period of time; and
   computer-readable program code which identifies at least one of the connecting nodes as the point of loss based on the monitored number of data records and the determined topology; and
wherein a plurality of network appliances configured to obtain a number of data records passing between a pair of connecting nodes during a time period are positioned between respective ones of the connecting nodes, wherein the computer-readable program code which monitors further comprises:
   computer-readable program code which identifies at least one of the network appliances on the topology; and
   computer-readable program code which obtains the number of data records from the source directed to the destination obtained by the identified at least one network appliance during the determined period of time; and
wherein the computer-readable program code which identifies at least one of the network appliances on the topology and the computer-readable program code which obtains the number of data records from the source directed to the destination obtained by the identified at least one network appliance during the determined period of time further comprise:
   computer-readable program code which identifies at least one first hop one of the network appliances which is coupled to the source over the communication network;
   computer-readable program code which identifies at least one next hop one of the network appliances which is coupled between the at least one first hop one of the network appliances and the destination;
   computer-readable program code which obtains a number of data records from the source directed to the destination obtained by the at least one first hop one of the network appliances and the at least one next hop one of the network appliances during the determined time period; and
wherein the computer-readable program code which identifies at least one of the connecting nodes as the point of loss further comprises:
   computer-readable program code which compares the number of data records from the source directed to the destination obtained by one of the at least one first hop one of the network appliances with the number of data records from the source directed to the destination obtained by ones of the at least one next hop one of the network appliances coupled between the one of the at least one first hop one of the network appliances and the destination; and computer-readable program code which identifies a connecting node positioned between the at least one first hop one of the network appliances and the ones of the at least one next hop one of the network appliances as the point of loss for data records if the number of data records from the source directed to the destination obtained by one of the at least one first hop one of the network appliances differs by a threshold amount from the number of data records from the source directed to the destination obtained by ones of the at least one next hop one of the network appliances coupled between the one of the at least one first hop one of the network appliances and the destination.

28. The computer program product of claim 27 wherein the at least one first hop one of the network appliances is coupled to the source without intervening ones of the network appliances being coupled between the source and the first hop one of the network appliances and wherein the at least one next hop one of the network appliances is coupled between the at least one first hop one of the network appliances and the destination without intervening ones of the network appliances being coupled between the at least one first hop one of the network appliances and the at least one next hop one of the network appliances.

29. The computer program product of claim 27 wherein the computer-readable program code which compares the number of data records from the source directed to the destination-obtained by one of the at least one first hop one of the network appliances with the number of data records from the source directed to the destination obtained by ones of the at least one next hop one of the network appliances coupled between the one of the at least one first hop one of the network appliances and the destination further comprises computer-readable program code which compares a number of data records from the source directed to the destination obtained by an upstream one of the network appliances with a number of data records from the source directed to the destination obtained by at least one downstream one of the network appliances coupled between the upstream one of the network appliances and the destination at an adjacent downstream position for successive ones of the network appliances until at least one of the destination is reached or at least one of the connecting nodes is identified as the point of loss for data records and wherein the computer-readable program code which identifies a connecting node positioned between the at least one first hop one of the network appliances and the ones of the at least one next hop one of the network appliances as the point of loss for data records comprises computer-readable program code which identifies a connecting node positioned between the upstream one of the network appliances and corresponding downstream ones of the network appliances as the point of loss for data records if the number of data records from the source directed to the destination obtained by the upstream-one of the network appliances differs by a threshold amount from the number of data records from the source directed to the destination obtained by the corresponding downstream ones of the network appliances.

30. The computer program product of claim 29 wherein the computer-readable program code which compares a number of data records from the source directed to the destination obtained by an upstream one of the network appliances with a number of data records from the source directed to the destination obtained by at least one downstream one of the network appliances coupled between the upstream ones of the network appliances and the destination at an adjacent downstream position compares successive ones of the network appliances on the topology until the destination is reached and wherein the computer-readable program code which identifies at least one of the connecting nodes as the point of loss further comprises computer-readable program code which identifies all connecting nodes positioned between upstream ones of the network appliances and corresponding downstream ones of the network appliances as points of loss for data records if the number of data records from the source directed to the destination obtained by respective upstream ones of the network appliances differs by a threshold amount from the number of data records from the source directed to the destination obtained by corresponding downstream ones of the network appliances.

31. The computer program product of claim 27 further comprising computer-readable program code which adjusts obtained numbers of data records from the source directed to the destination to compensate for in transit introduced changes to data records before comparing the number of data records from the source directed to the destination obtained by one of the at least one first hop one of the network appliances with the number of data records from the source directed to the destination obtained by ones of the at least one next hop one of the network appliances coupled between the one of the at least one first hop one of the network appliances and the destination.

32. The computer program product of claim 31 wherein the computer-readable program code which adjusts obtained numbers of data records comprises computer-readable program code which adjusts obtained numbers of data records from the source directed to the destination to compensate for encryption related changes in data records introduced by a connecting node coupled between the a first hop one and at least one next hop one of the network appliances.

33. The computer program product of claim 27 further comprising computer-readable program code which defines the determined period of time for the at least one first hop one of the network appliances and the at least next hop one of the network appliances based on a delay between the at least one first hop one of the network appliances and the at least next hop one of the network appliances.

34. The computer program product of claim 33 wherein the computer-readable program code which defines the determined time period further comprises computer-readable program code which defines the determined period of time for the at least one first hop one of the network appliances and the at least next hop one of the network appliances based on an average delay between the at least one first hop one of the network appliances and the at least next hop one of the network appliances determined over an averaging window.

35. The computer program product of claim 27 further comprising computer-readable program code which defines the threshold amount based on an expected timing related variability between numbers of data records obtained by ones of the network appliances.

36. The computer program product of claim 35 wherein the computer-readable program code which defines the threshold amount further comprises computer-readable program code which defines the threshold amount based on a percentage of data record throughput for respective ones of the network appliances.

37. The computer program product of claim 27 wherein the connecting nodes are routing devices selected from the group consisting of routers, bridges and switches.

38. The computer program product of claim 27 wherein a network appliance is positioned between each defined connecting node in the topology and all other adjacent defined connecting nodes in the topology.

39. The computer program product of claim 38 wherein at least one of the defined connecting nodes comprises a plurality of routing devices.

* * * * *